(12) United States Patent
Hisano et al.

(10) Patent No.: US 11,201,825 B2
(45) Date of Patent: Dec. 14, 2021

(54) TRANSFER DEVICE AND TRANSFER METHOD

(71) Applicant: NIPPON TELEGRAPH AND TELEPHONE CORPORATION, Tokyo (JP)

(72) Inventors: Daisuke Hisano, Tokyo (JP); Yu Nakayama, Tokyo (JP); Takahiro Kubo, Tokyo (JP); Youichi Fukada, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 16/965,925

(22) PCT Filed: Feb. 1, 2019

(86) PCT No.: PCT/JP2019/003637
§ 371 (c)(1),
(2) Date: Jul. 29, 2020

(87) PCT Pub. No.: WO2019/151484
PCT Pub. Date: Aug. 8, 2019

(65) Prior Publication Data
US 2021/0083982 A1 Mar. 18, 2021

(30) Foreign Application Priority Data
Feb. 1, 2018 (JP) .............................. JP2018-016659

(51) Int. Cl.
*H04L 12/851* (2013.01)
*H04L 12/825* (2013.01)
*H04L 12/801* (2013.01)

(52) U.S. Cl.
CPC ........ *H04L 47/2408* (2013.01); *H04L 47/245* (2013.01); *H04L 47/266* (2013.01); *H04L 47/33* (2013.01)

(58) Field of Classification Search
CPC . H04L 47/2408; H04L 47/245; H04L 47/266; H04L 47/33; H04L 47/32; H04L 47/24
See application file for complete search history.

(56) References Cited

U.S. PATENT DOCUMENTS

2002/0126675 A1* 9/2002 Yoshimura .......... H04L 47/2408
370/395.21
2008/0056192 A1* 3/2008 Strong .................... H04L 47/56
370/331

(Continued)

FOREIGN PATENT DOCUMENTS

| JP | 2005101690 A | 4/2005 |
|---|---|---|
| JP | 2016005023 A | 1/2016 |
| JP | 6211218 B | 9/2017 |

OTHER PUBLICATIONS

Winkel et al, IEEE 802.3br TF Interspersing express traffic (IET) Mar. 2015, Berlin, Germany (Year: 2015).*
Nakayama et al Low-Latency Routing Scheme for a Fronthaul Bridged Network, Jan. 2018, J. Opt. Commun. Netw./vol. 10 (Year: 2018).*

(Continued)

*Primary Examiner* — Yaotang Wang
(74) *Attorney, Agent, or Firm* — Harness, Dickey & Pierce, P.L.C.

(57) ABSTRACT

A transfer device for coupling a priority signal and a standard signal includes a reception unit configured to receive a plurality of signals transmitted from a device connected to a path different from a forwarding path, a separation unit configured to separate the signals into the priority signal and the standard signal, an identifier reference unit configured to reference an identifier added to the standard signal, an identifier sort unit configured to sort the standard signal by the identifier, a signal coupling unit (Continued)

configured to couple the plurality of standard signals, a multiplexing unit configured to multiplex the priority signal and the standard signal, a priority control unit configured to determine a transfer order of the signals, a transmission unit configured to transmit the signals to a device connected to the forwarding path, an interrupt transfer processing unit configured to perform interrupt processing in a case where the priority signal arrives during transfer of the standard signal, a signal division unit configured to divide the standard signal, an identifier addition unit configured to add the identifier to the standard signal divided, and a transmission suspending unit configured to suspend transfer of the standard signal until transfer of the priority signal is completed.

6 Claims, 12 Drawing Sheets

(56) References Cited

U.S. PATENT DOCUMENTS

2015/0365340 A1    12/2015  Fukuda et al.
2019/0081903 A1*   3/2019  Kobayashi .......... H04L 47/6275
2019/0373086 A1*  12/2019  Qi ........................ H04L 69/166

OTHER PUBLICATIONS

"IEEE 802.3br Interspersing Express Traffic(IET) Task Force(TF) Baseline", Jan. 14, 2015.
Hiroshi Bessho et al., "Encouragement Talk" Experimental Study of Frame Preemption for Ultra Low Latency Network, IEICE Technical Report, vol. 115, No. 404, pp. 97-102, Jan. 2016 (with abstract).
International Search Report (in English and Japanese) issued in PCT/JP2019/003637, dated Mar. 12, 2019.

* cited by examiner

| NODE IDENTIFIER | OPERATIONAL RULE | TRANSFER DESTINATION FUNCTION UNIT |
|---|---|---|
| 1 | DISCARD | FRAME DISCARDING UNIT |
| 2 | DEFRAGMENT | NODE IDENTIFIER DISCARDING UNIT |
| 3 | DISCARD | FRAME DISCARDING UNIT |
| ⋮ | ⋮ | ⋮ |
| N-1 | DEFRAGMENT | NODE IDENTIFIER DISCARDING UNIT |
| N | DEFRAGMENT | NODE IDENTIFIER DISCARDING UNIT |

Fig. 5

| NODE IDENTIFIER | OPERATIONAL RULE | TRANSFER DESTINATION FUNCTION UNIT |
|---|---|---|
| 1 | DISCARD | FRAME DISCARDING UNIT |
| 2 | DEFRAGMENT | NODE IDENTIFIER DISCARDING UNIT |
| 3 | DISCARD | FRAME DISCARDING UNIT |
| ⋮ | ⋮ | ⋮ |
| N-1 | PASS | MULTIPLEXING UNIT |
| N | DEFRAGMENT | NODE IDENTIFIER DISCARDING UNIT |

Fig. 8

TRANSFER DEVICE AND TRANSFER METHOD

CROSS-REFERENCE TO RELATED APPLICATIONS

This application is a 371 National Stage of International Application No. PCT/JP2019/003637, filed on Feb. 1, 2019, which claims priority to Japanese Application No. 2018-016659, filed on Feb. 1, 2018. The entire disclosures of the above applications are incorporated herein by reference.

TECHNICAL FIELD

The present invention relates to a transfer device and a transfer method.

BACKGROUND ART

In an access network, a packet transfer device (hereinafter referred to as a "transfer device") that performs data traffic transfer processing concentrates data traffic for multiple services. The transfer device multiplexes the data traffic of multiple services and transfers the multiplexed data traffic through an edge router to a core network.

The core network is a large capacity backbone communication network that connects telecommunications carriers with each other. The transfer device identifies a priority included in a Layer 2 frame and identifies a source user by use of a user identifier.

A new service for concentrated data traffic is mobile data traffic. One configuration of a radio access network includes a centralized radio access network (C-RAN) in which a large number of optical remote stations (Distributed Units (DUs)) are deployed with high density and a radio control device (Central Unit (CU)) aggregates radio signals to perform signal processing. The CU and the DUs are communicatively connected with each other over an optical access network called a mobile fronthaul (MFH)). An example of a configuration of this MFH is illustrated in FIG. 9.

In data traffic over the MFH, high level requirements for a delay in data transfer between the CU and the DUs (hereinafter referred to as "e2e (end-to-end) delay") are demanded. For example, in Third Generation Partnership Project (3GPP) TR 38.801 Option 6, the worst case value of e2e delay is defined as 250 microseconds (μs).

A priority service for which such low latency is required is referred to as an "Express service" below.

On the other hand, a standard service for which such low latency is not required is referred to as a "Normal service" below.

Examples of a delay constituting the e2e delay includes a processing delay generated by transfer processing in a layer 2 switch, a propagation delay that is a time taken for physical transmission between the layer 2 switches, and a queuing delay generated between packets. For example, as illustrated in FIG. 10, in a case that a Normal service frame (hereinafter referred to as a "Normal frame") arrives at a time slightly earlier than an Express service frame (hereinafter referred to as an "Express frame"), and these Normal and Express frames are output from an identical transmission port, the Express frame is not transferred and in a suspended state until transfer of the Normal frame is complete. This generates a delay, which is referred to as a queuing delay.

In order to minimize the queuing delay in the transfer of the Express frame, in Institute of Electrical and Electronics Engineers (IEEE) 802.3br Interspersing Express Traffic (IET), a Frame Preemption (FP) scheme for interrupt transfer of the Express frame is under study (NPL 1).

A transfer method based on the FP scheme is illustrated in FIG. 11. In the FP scheme, in a case that an Express frame arrives when a Normal frame is transferred, the Normal frame is divided (fragmented). At this time, a header called "SMD-Ix" or "SMD-Cx" and "Frag Count" which dedicated to the FP scheme is added at a start of the fragmented Normal frame (hereinafter referred to as a "fragmented frame"). In addition, information referred to as "MFCS" is added at an end of each of fragment frames other than the last fragmented frame. Transfer processing for the fragmented frame is performed after completion of the transfer of the Express frame.

A frame configuration of a Normal frame in the FP scheme is illustrated in FIG. 12. "Preamble" is for synchronization for transmission and reception. "SMD-Ix" is added to a header of a non-fragmented Normal frame and a header of the first fragmented frame. "SMD-Cx" is added to a header(s) of a fragmented frame(s) other than the first fragment frame. "MAC DA" indicates a MAC address of a destination device. "MAC SA" indicates a Media Access Control (MAC) address of a source device. "Type" indicates a field identifying a higher layer protocol.

Note that the transfer device sets "SMD-Cx" in the headers of the fragmented frames fragmented from the identical Normal frame to the same value. The transfer device increments a value of "Frag Count" to check if an intermediate fragmented frame is not lost.

CITATION LIST

Non Patent Literature

NPL 1: "IEEE 802.3br Interspersing Express Traffic(IET) Task Force(TF) Baseline", January 2015, Internet <URL: http://www.ieee802.org/3/br/Baseline/8023-IET-TF-1405_Winkel-iet-Baseline-r4.pdf>

SUMMARY OF THE INVENTION

Technical Problem

As illustrated in FIG. 12, a header "SMD-Cx", which is a header dedicated to the FP scheme, or the like is added to the fragmented frame. The transfer device checks the values of "SMD-Ix" and "SMD-Cx" when combining (defragmenting) the fragmented frames. The transfer device determines whether a plurality of fragmented frames are fragmented frames fragmented from an identical Normal frame, based on a check result of the values. The transfer device then defragments the fragmented frames which are determined to be fragmented from the identical Normal frame.

However, in known FP schemes, it is assumed that a transmission port and a reception port are connected on a one-to-one basis, and it is not assumed that the transfer device receives fragmented frames from a plurality of bridge nodes. Specifically, in the FP scheme described in NPL 1, only four types of values are used for "SMD-Ix" and "SMD-Cx", and these values are cyclically reused. Therefore, if the FP scheme described in NPL 1 is used in a transfer device that receives a fragmented frame from each of a plurality of bridge nodes, unintentionally the values of "SMD-Ix", "SMD-Cx" and "Frag Count" are likely to match even though the fragmented frames are a plurality of fragmented frames fragmented from different Normal frames in different bridge nodes. In this case, the transfer device may mistakenly defragment the plurality of fragmented frames that are fragmented from different Normal frames.

The present invention has been made in view of such circumstances, and an object of the present invention is to provide a transfer device and a transfer method capable of correctly defragmenting fragmented frames.

Means for Solving the Problem

An aspect of the present invention is a transfer device for coupling a priority service signal and a standard service signal, and transferring signals to form a communication network, the transfer device including: a reception unit configured to receive a plurality of signals transmitted from a device connected to a path different from a forwarding path in a transfer route of the communication network; a separation unit configured to separate the plurality of signals received by the reception unit into the priority service signal and the standard service signal; an identifier reference unit configured to reference a unique identifier added to the standard service signal; an identifier sort unit configured to sort the standard service signal by the unique identifier referenced by the identifier reference unit; an identifier discarding unit configured to discard the unique identifier added to the standard service signal sorted by the identifier sort unit; a signal coupling unit configured to hold a plurality of the standard service signals of which the unique identifiers are discarded by the identifier discarding unit and couple the plurality of the standard service signals; a multiplexing unit configured to multiplex the priority service signal separated by the separation unit and multiplex the standard service signal coupled by the signal coupling unit; a buffer unit configured to hold signals for respective services multiplexed by the multiplexing unit; a priority control unit configured to determine a transfer order of the signals held by the buffer unit in accordance with priorities of the signals; a transmission unit configured to transmit the signals for respective services to a device connected to the forwarding path in the transfer route; an interrupt transfer processing unit configured to perform interrupt processing in a case where the priority service signal arrives during transfer of the standard service signal; a signal division unit configured to divide the standard service signal in a case where the interrupt processing is performed by the interrupt transfer processing unit; an identifier addition unit configured to add the unique identifier to the standard service signal divided by the signal division unit; and a transmission suspending unit configured to suspend transfer of the standard service signal until transfer of the priority service signal is completed.

An aspect of the present invention is the transfer device described above, wherein the identifier addition unit adds the unique identifier based on an identifier corresponding to the standard service.

An aspect of the present invention is the transfer device described above, wherein the identifier addition unit adds the unique identifier based on a randomly generated value.

An aspect of the present invention is the transfer device described above, wherein the identifier addition unit adds the unique identifier that is a hash value generated based on an identifier corresponding to the standard service.

An aspect of the present invention is the transfer device described above further including a coupling determination unit configured to determine whether to couple the signals by the signal coupling unit on the basis of the identifier referenced by the identifier reference unit.

An aspect of the present invention is a transfer method performed by a transfer device for coupling a priority service signal and a standard service signal, and transferring signals to form a communication network, the transfer method including: receiving a plurality of signals transmitted from a device connected to a path different from a forwarding path in a transfer route of the communication network; separating the plurality of signals received by the receiving into the priority service signal and the standard service signal; referencing a unique identifier added to the standard service signal; sorting the standard service signal by the unique identifier referenced by the referencing; discarding the unique identifier added to the standard service signal sorted by the sorting; buffering a plurality of the standard service signals of which the unique identifiers are discarded by the discarding and coupling the plurality of the standard service signals; multiplexing the priority service signal separated by the separating and the standard service signal coupled by the coupling; holding signals for respective services multiplexed by the multiplexing unit; determining a transfer order of the signals held by the buffering in accordance with priorities of the signals; transmitting the signals for respective services to a device connected to the forwarding path in the transfer route; performing interrupt processing in a case where the priority service signal arrives during transfer of the standard service signal; dividing the standard service signal in a case where the interrupt processing is performed by the interrupt transfer processing unit; adding the unique identifier to the standard service signal divided by the dividing; and suspending transfer of the standard service signal until transfer of the priority service signal is completed.

Effects of the Invention

According to the present invention, the fragmented frame can be correctly defragmented.

BRIEF DESCRIPTION OF DRAWINGS

FIG. 5 is a diagram illustrating a configuration of a reference table used in the first embodiment.

FIG. 8 is a diagram illustrating a configuration of a reference table used in the third embodiment.

DESCRIPTION OF EMBODIMENTS

First Embodiment

Hereinafter, a first embodiment according to the present invention will be described.

A transfer device 1 according to the first embodiment is a bridge node that implements an FP scheme. The transfer device 1 couples an Express service (priority service) signal and a Normal service (standard service) signal and transfers the signal to form a communication network. Hereinafter, a configuration of the transfer device 1 will be described with reference to the drawings.

Configuration of Transfer Device

Figure 1:
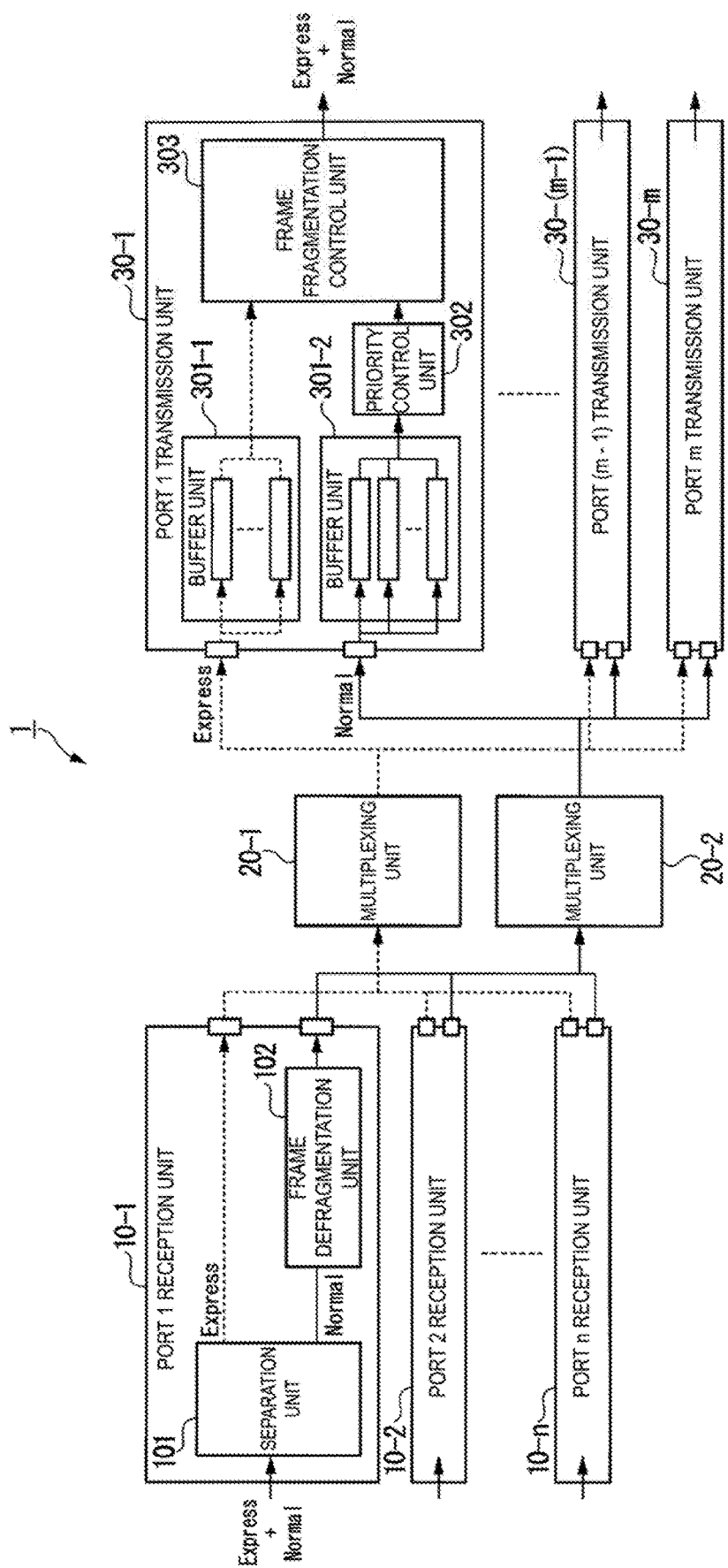
FIG. 1 is a block diagram illustrating a functional configuration of a transfer device according to a first embodiment.

FIG. 1 is a block diagram illustrating a functional configuration of the transfer device 1 according to the first embodiment. As illustrated in FIG. 1, the transfer device 1 includes n reception ports (a port 1 reception unit 10-1, a port 2 reception unit 10-2, . . . , and a port n reception unit 10-n), two multiplexing units (a multiplexing unit 20-1 and a multiplexing unit 20-2), and m transmission ports (a port 1 transmission unit 30-1, . . . , and a port (m−1) transmission unit 30-(m−1), and a port m transmission unit 30-m.

Note that the port 1 reception unit 10-1, the port 2 reception unit 10-2, . . . , and the port n reception unit 10-n are referred to as a "reception unit 10" if not necessarily distinguished for description. The port 1 transmission unit 30-1, . . . , the port (m−1) transmission unit 30-(m−1), and the port m transmission unit 30-m are referred to as a "transmission unit 30" if not necessarily distinguished for description.

The reception unit 10 receives a plurality of signals transmitted from another bridge node(s) (a transfer device(s) or a terminating device(s)) connected to a path different from a forwarding path in a transfer route of the communication network. The signals received by the reception unit 10 include an Express frame (a priority service signal) and a Normal frame (a standard service signal). As illustrated in FIG. 1, the reception unit 10 includes a separation unit 101 and a frame defragmentation unit 102.

The separation unit 101 separates the received signals into the Express frame and the Normal frame.

The separation unit 101 outputs the separated Express frame to the multiplexing unit 20-1 and the multiplexing unit 20-2. The separation unit 101 outputs the separated Normal frame to the frame defragmentation unit 102. Note that the separated Normal frame may be a fragmented frame (fragmented Normal frame).

The frame defragmentation unit 102 acquires the Normal frame output from the separation unit 101. In a case where the acquired Normal frame is a fragmented frame, the frame defragmentation unit 102 defragments a plurality of acquired fragmented frames. The frame defragmentation unit 102 outputs the defragmented Normal frame to the multiplexing unit 20-1 and the multiplexing unit 20-2.

The multiplexing unit 20-1 acquires the Express frames output from the respective separation units 101. The multiplexing unit 20-1 multiplexes the acquired Express frames. The multiplexing unit 20-1 outputs the multiplexed Express frames to each of the transmission units 30.

The multiplexing unit 20-2 acquires the Normal frames output from the respective frame defragmentation units 102. The multiplexing unit 20-2 multiplexes the acquired Normal frames. The multiplexing unit 20-2 outputs the multiplexed Normal frames to the respective transmission units 30.

The transmission unit 30 transmits the signals for each service (Express frame and Normal frame) to a bridge node (another transfer device) connected to the forwarding path in the transfer route. The transmission unit 30 acquires the Express frames output from the multiplexing unit 20-1 and the Normal frames output from the multiplexing unit 20-2. As illustrated in FIG. 1, the transmission unit 30 includes a buffer unit 301-1, a buffer unit 301-2, a priority control unit 302, and a frame fragmentation control unit 303.

The buffer unit 301-1 queues (holds) the acquired Express frames for each service in conformance to the service class. The buffer unit 301-1 outputs the Express frames to the frame fragmentation control unit 303.

The buffer unit 301-2 queues (holds) the acquired Normal frames for each service in conformance to the service class. The buffer unit 301-2 outputs the Normal frames to the priority control unit 302.

The priority control unit 302 acquires the Normal frames output from the buffer unit 301-2. The priority control unit 302 determines a transfer order of the Normal frames buffered by the buffer unit 301-2 in accordance with priorities of the Normal frames. The priority control unit 302 outputs the Normal frames to the frame fragmentation control unit 303 in the determined transfer order.

The frame fragmentation control unit 303 acquires the Express frames output from the buffer unit 301-1 and the Normal frames output from the buffer unit 301-2. The frame fragmentation control unit 303 transfers the Express frames and the Normal frames to a destination bridge node by the transfer method based on the FP scheme described above.

Frame Configuration

Hereinafter, an example of a frame configuration will be described with reference to the drawings.

Figure 2:
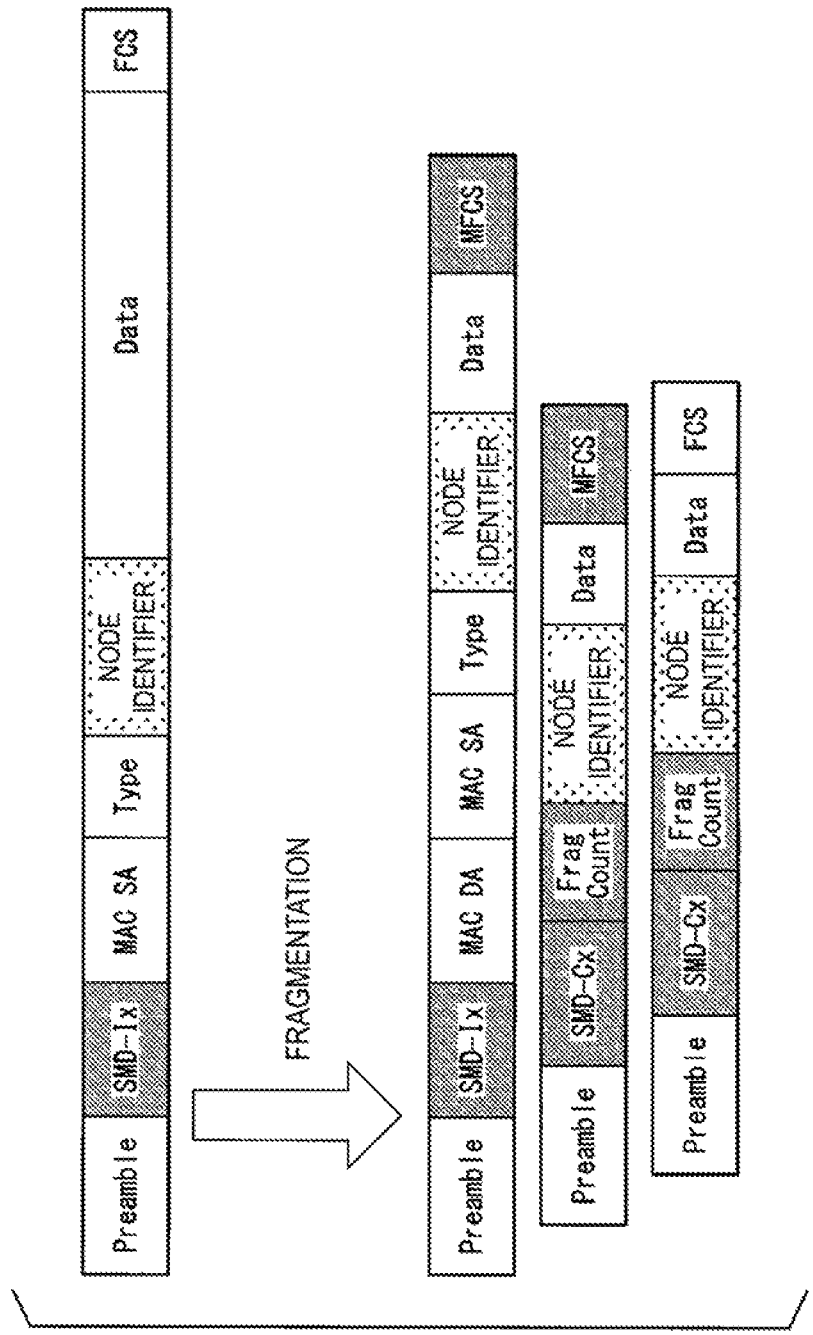
FIG. 2 is a diagram illustrating a frame configuration of a frame used in the first embodiment.

FIG. 2 is a diagram illustrating a frame configuration of a frame used in the first embodiment. As illustrated in the top row in FIG. 2, a "node identifier" is added at an end of a header portion of each of the Normal frame and the Express frame in advance. The node identifier is set to a unique value for each bridge node (for each service). The Normal frame to be fragmented is fragmented into a plurality of (three in FIG. 2) fragmented frames as illustrated in the lower rows in FIG. 2. The "node identifier" is added at an end of a header portion of each of the fragmented frames, and the respective "node identifiers" are set to the same value.

Configuration of Frame Fragmentation Control Unit

Figure 3:
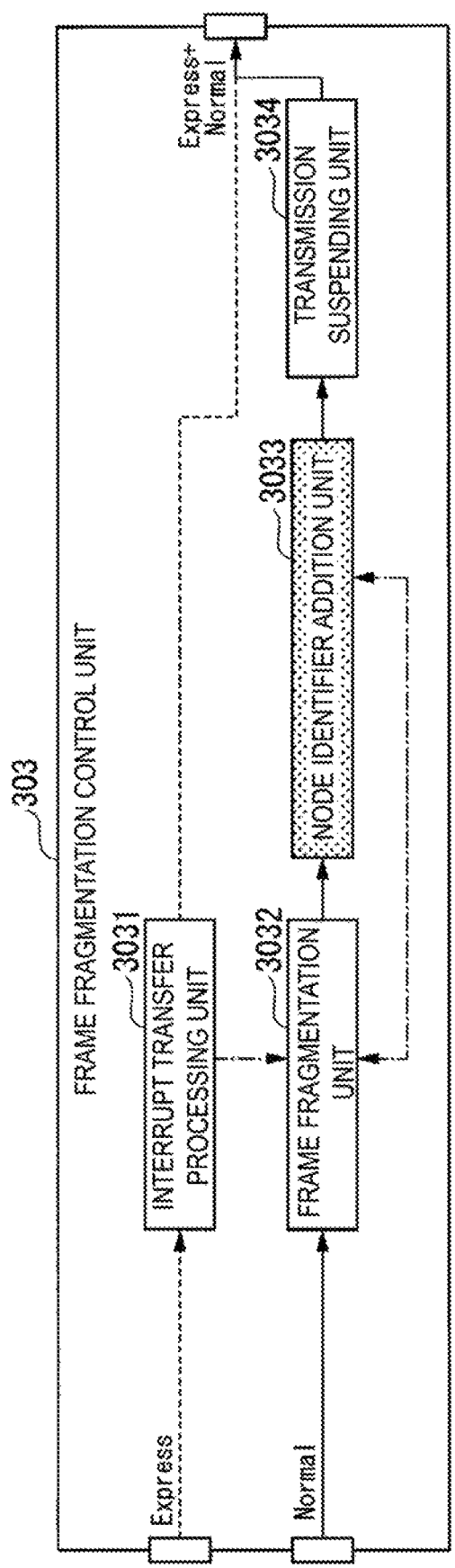
FIG. 3 is a block diagram illustrating a configuration of a frame fragmentation control unit of the transfer device according to the first embodiment.

Hereinafter, a configuration of the frame fragmentation control unit 303 will be described. FIG. 3 is a block diagram illustrating a configuration of the frame fragmentation control unit 303 of the transfer device 1 according to the first embodiment. As illustrated in FIG. 3, the frame fragmentation control unit 303 is configured to include an interrupt transfer processing unit 3031, a frame fragmentation unit 3032, a node identifier addition unit 3033, and a transmission suspending unit 3034.

The interrupt transfer processing unit 3031 performs interrupt processing in a case where an Express frame arrives during transfer of a Normal frame. Specifically, in a case where an Express frame arrives during the transfer of the Normal frame, an instruction for fragmenting the Normal frame is output to the frame fragmentation unit 3032.

The frame fragmentation unit 3032 (signal fragmentation unit) fragments the Normal frame in a case where the interrupt processing is performed by the interrupt transfer processing unit 3031 (specifically, in a case where the frame fragmentation unit 3032 acquires the instruction output from the interrupt transfer processing unit 3031).

The node identifier addition unit 3033 adds a node identifier (unique identifier) to the Normal frames fragmented by the frame fragmentation unit 3032. Here, the node identifier needs to be an identifier capable of uniquely identifying a plurality of bridge nodes. Thus, a unique identifier (e.g., a source MAC address) based on an identifier corresponding to the Normal service (standard service) is used as a node identifier.

The transmission suspending unit 3034 suspends transfer of the Normal frame until transfer of the Express frame is complete.

Configuration of Frame Defragmentation Unit

Figure 4:
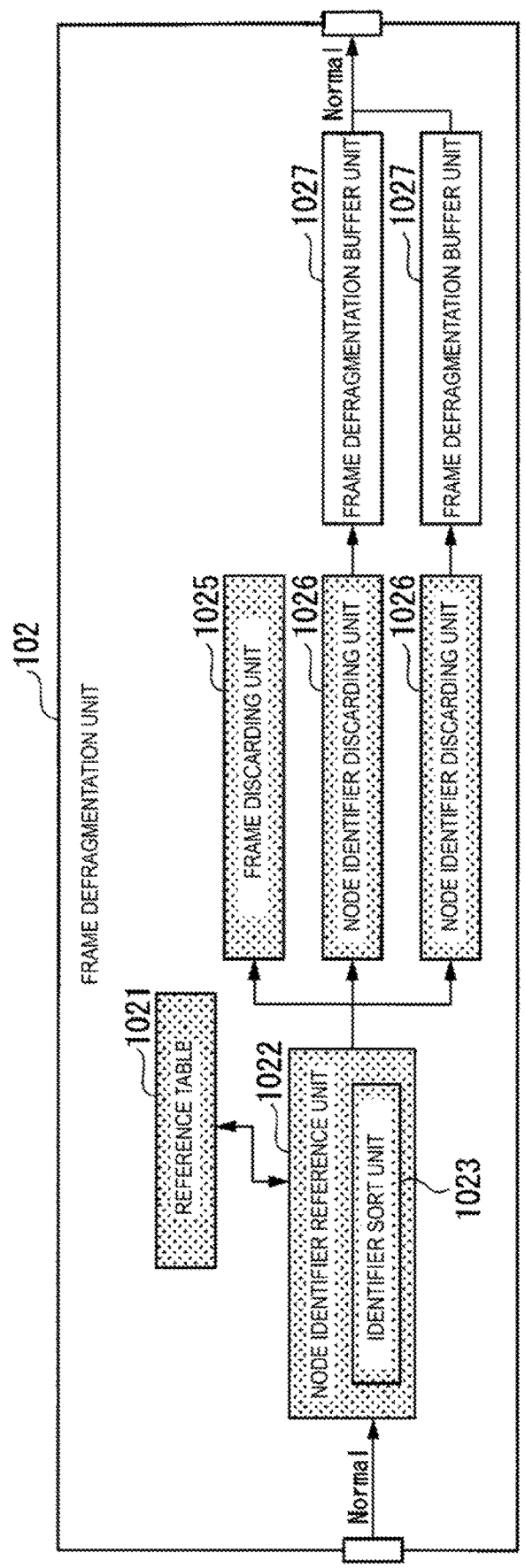
FIG. 4 is a block diagram illustrating a configuration of a frame defragmentation unit of the transfer device according to the first embodiment.

Hereinafter, a configuration of the frame defragmentation unit 102 will be described. FIG. 4 is a block diagram illustrating a configuration of the frame defragmentation unit 102 of the transfer device 1 according to the first embodiment. As illustrated in FIG. 4, the frame defragmentation unit 102 includes a reference table 1021, a node identifier reference unit 1022, a frame discarding unit 1025, a plurality of node identifier discarding units 1026, and a plurality of frame defragmentation buffer units 1027. As illustrated in FIG. 4, the node identifier reference unit 1022 includes an identifier sort unit 1023.

Note that, in FIG. 4, two node identifier discarding units 1026 and two frame defragmentation buffer units 1027 are illustrated, but the numbers of respective units may be arbitrary (e.g., may be equal to the number of bridge nodes that transmit a signal to the transfer device 1, or the like).

The reference table 1021 is a table containing information indicating whether or not a node identifier is one to be added to the Normal frame to be received (or, to be transferred by the transfer device 1). The reference table 1021 is held in advance in the frame defragmentation unit 102.

The node identifier reference unit 1022 references the node identifier added to the Normal frame. The node identifier reference unit 1022 compares the referenced node identifier with the node identifier included in the reference table 2021. In a case where the node identifier reference unit 1022 determines, based on a result of the comparison, that the Normal frame to which the referenced node identifier is added is a Normal frame to be discarded, the node identifier reference unit 1022 outputs the Normal frame to the frame discarding unit 1025. In other words, the node identifier reference unit 1022 performs a process to remove the Normal frame to which an unexpected node identifier is added.

The identifier sort unit 1023 sorts, by node identifier, the plurality of received Normal frames with the Normal frame to which the unexpected node identifier is added removed. The identifier sort unit 1023 outputs the sorted Normal frames separately to the different node identifier discarding units 1026.

The frame discarding unit 1025 acquires the Normal frame output from the node identifier reference unit 1022. The frame discarding unit 1025 discards the acquired Normal frame.

Each node identifier discarding unit 1026 acquires the Normal frame output from the identifier sort unit 1023. The node identifier discarding unit 1026 discards the node identifier from the header of the acquired Normal frame. The node identifier discarding unit outputs the Normal frame with the node identifier being discarded to the frame defragmentation buffer unit 1027.

Each frame defragmentation buffer unit 1027 acquires the Normal frame output from the node identifier discarding unit 1026. The frame defragmentation buffer unit 1027 temporarily holds a plurality of Normal frames with the node identifiers being discarded by the node identifier discarding unit 1026.

The frame defragmentation unit 102 defragments the Normal frames output to the frame defragmentation buffer units 1027 according to the transfer method based on the FP scheme described above.

Configuration of Reference Table

Hereinafter, an example of a configuration of the reference table 1021 will be described. FIG. 5 is a diagram illustrating a configuration of the reference table 1021 used in the first embodiment. As illustrated in FIG. 5, the reference table 1021 contains data, in a form of two-dimensional table, of values of three items of "node identifier", "operational rule", and "transfer destination function unit" which are associated with each other.

The item "node identifier" stores a value of the node identifier.

The item "operational rule" stores a value indicating whether the received Normal frame is a Normal frame to be "discarded" or is a Normal frame "to be defragmented".

The item "transfer destination function unit" stores a value indicating whether an output destination of the received Normal frame is the frame discarding unit 1025 or the node identifier discarding units 1026.

By referencing to the reference table 1021 above, the node identifier reference unit 1022 can determine whether to perform discarding or defragmenting on the received Normal frame.

Operation of Transfer Device

Hereinafter, an example of an operation of the transfer device 1 will be described with reference to the drawings.

Figure 6:
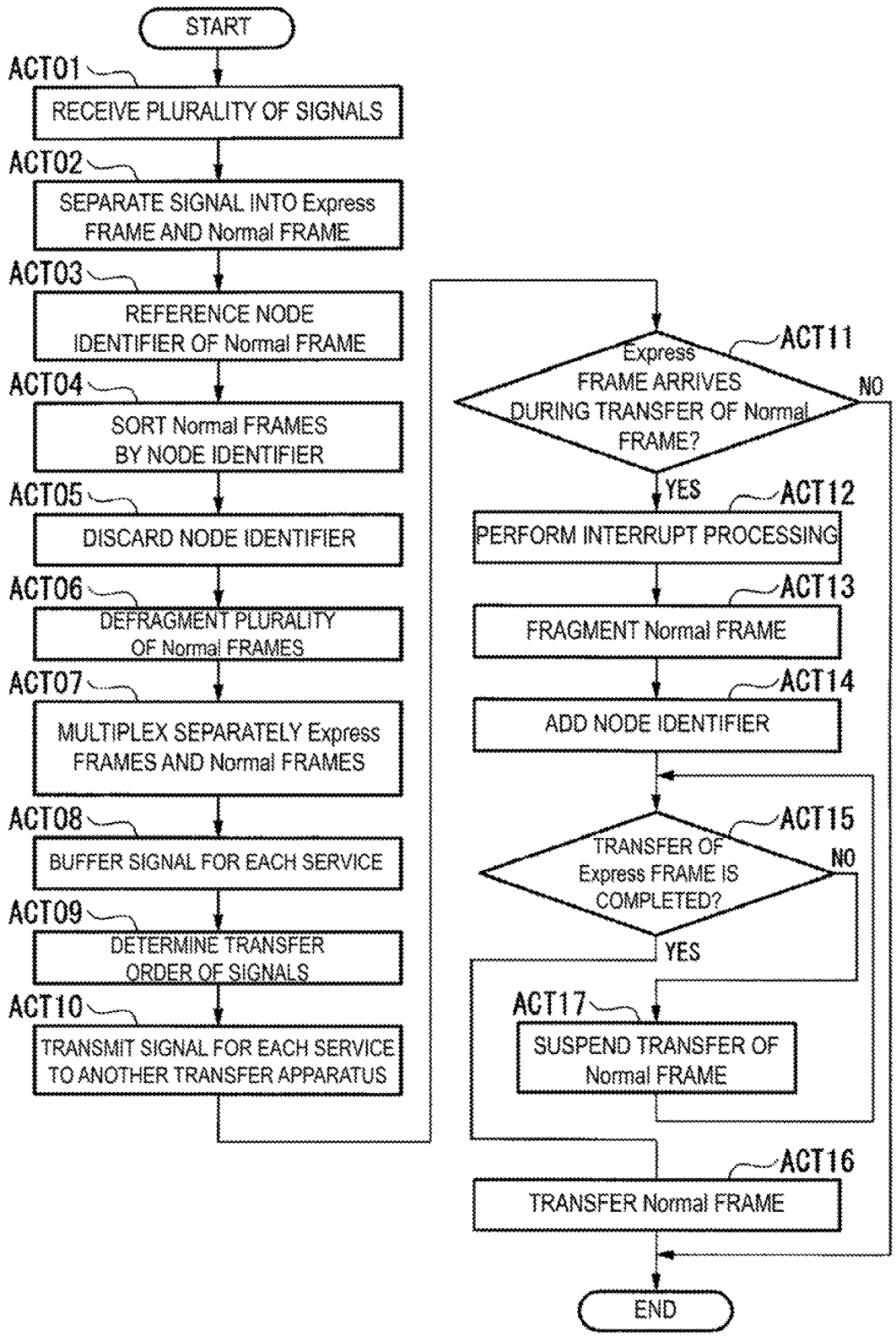
FIG. 6 is a flowchart illustrating an operation of the transfer device according to the first embodiment.

FIG. 6 is a flowchart illustrating the operation of the transfer device 1 according to the first embodiment.

The reception unit 10 receive a plurality of signals (Express frames and Normal frames) transmitted from a bridge node(s) (another transfer device(s) or terminating device(s)) connected to a path different from a forwarding path in a transfer route of the communication network (ACT 01).

The separation unit 101 separates the signals received by the reception unit 10 into Express frames (priority service signals) and Normal frames (standard service signals) (ACT 02).

The node identifier reference unit 1022 references the node identifier (unique identifier) added to each of the Normal frames (ACT 03).

The identifier sort unit 1023 sorts the Normal frames separately into a plurality of node identifier discarding units 1026 by node identifier referenced by the node identifier reference unit 1022 (ACT 04).

Each node identifier discarding unit 1026 discards the node identifier added to the Normal frame sorted by the identifier sort unit 1023 (ACT 05).

The frame defragmentation unit 102 (signal defragmentation unit) temporarily holds a plurality of Normal frames with the node identifiers being discarded by the node identifier discarding units 1026 to defragment the plurality of Normal frames (ACT 06).

The multiplexing unit 20-1 multiplexes the Express frames separated by the separation unit 101 and the multiplexing unit 20-2 multiplexes the Normal frames defragmented by the frame defragmentation unit 102 (ACT 07).

The buffer unit 301-1 temporarily buffers (holds) the signals for each service (Express frames) multiplexed by the multiplexing unit 20-1 and the buffer unit 301-2 temporarily buffers (holds) the signals for each service (Normal frames) multiplexed by the multiplexing unit 20-2 (ACT 08).

The priority control unit 302 determines a transfer order of the signals buffered (held) by the buffer unit 301-2 in accordance with priorities of the signals (ACT 09).

The transmission unit 30 transmits the signals for each service to a bridge node(s) (another transfer device(s)) connected to the forwarding path in the transfer route (ACT 10).

In a case where an Express frame arrives during transfer of a Normal frame (ACT 11, YES), the interrupt transfer processing unit 3031 performs interrupt processing (ACT 12). In a case where an Express frame does not arrive during transfer of a Normal frame (ACT 11, NO), the flowchart illustrated in FIG. 6 is terminated.

In a case where the interrupt processing is performed by the interrupt transfer processing unit 3031, the frame fragmentation unit 3032 fragments the Normal frame (ACT 13).

The node identifier addition unit 3033 adds a node identifier (unique identifier) to an end of a header of each of the Normal frames fragmented by the frame fragmentation unit 3032 (ACT 14).

In a case where transfer of the Express frame is not completed (ACT 15, NO), the transmission suspending unit 3034 suspends transfer of the Normal frame until the transfer of the Express frame is completed (ACT 17).

In a case where transfer of the Express frame is completed (ACT 15, YES), the transmission suspending unit 3034 transfers the Normal frame (ACT 16).

As described above, the process of the flowchart illustrated in FIG. 6 is terminated.

Second Embodiment

In the first embodiment, the node identifier addition unit 3033 adds, as the node identifier, a unique identifier based on an identifier corresponding to the standard service, for example, a MAC address of the source bridge node (source MAC address). However, in a case of adding a source MAC address, a frame length of 8 bytes needs to be ensured.

In a second embodiment, the node identifier addition unit 3033 ensures only 1 byte of a header region for adding a node identifier to set a random value having a data length of 1 byte as a node identifier. This allows the frame length to reduce in a transfer device according to the second embodiment compared to the transfer device 1 according to the first embodiment.

Note that the node identifier addition unit 3033 may be configured to set, as the value of the node identifier, a hash value generated from the source MAC address by use of a hash table or the like.

Third Embodiment

Figure 7:
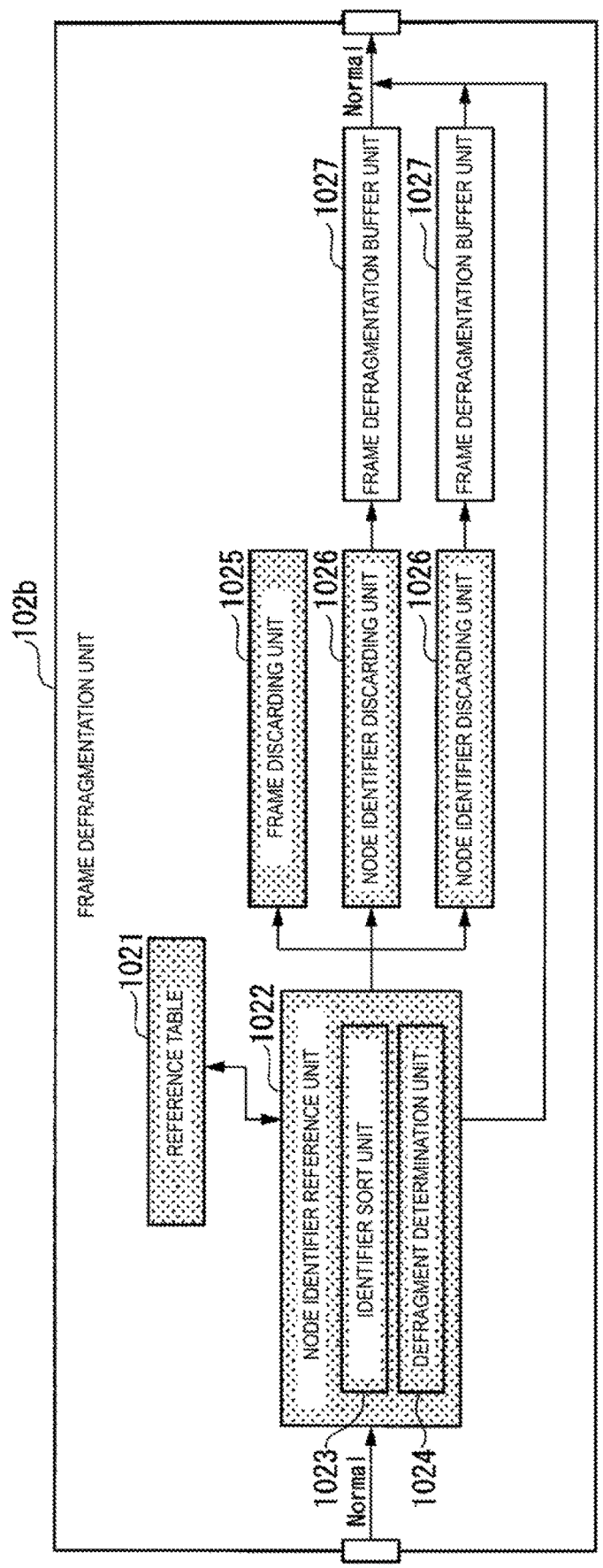
FIG. 7 is a block diagram illustrating a configuration of a frame defragmentation unit of a transfer device according to a third embodiment.
Figure 9:
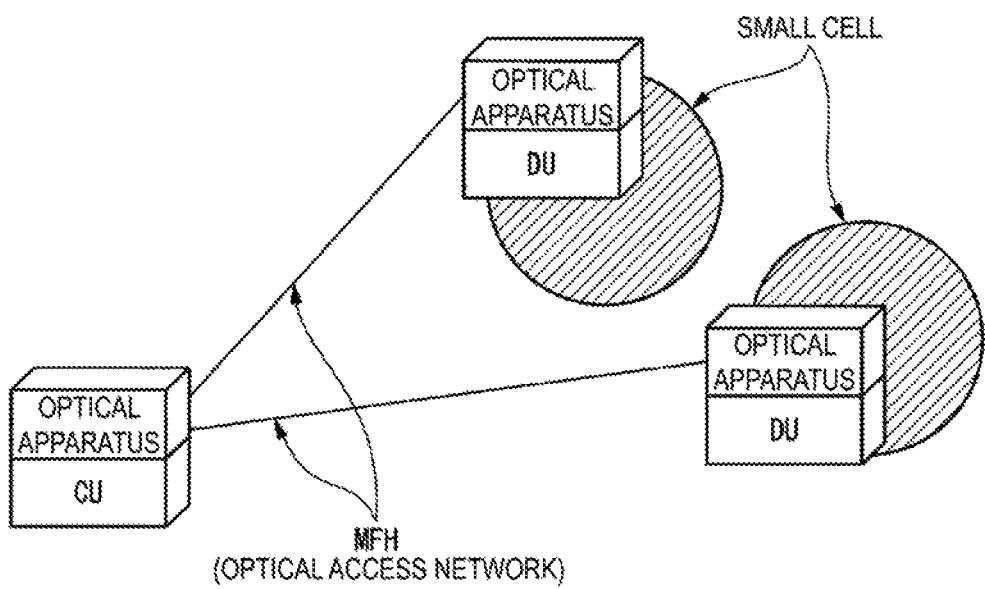
FIG. 9 is a diagram illustrating a configuration example of an MFH.
Figure 10:
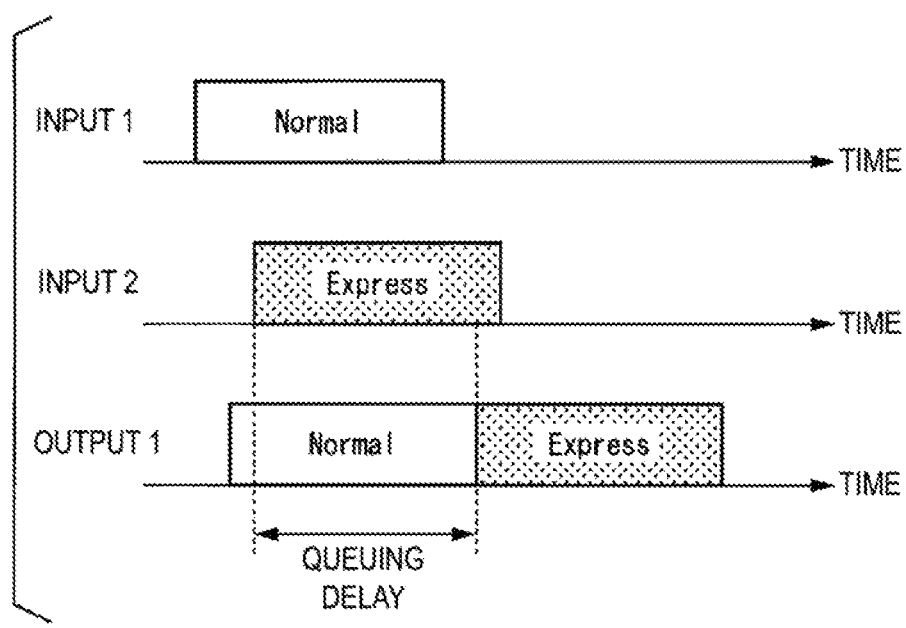
FIG. 10 is a diagram illustrating a general transfer method.
Figure 11:
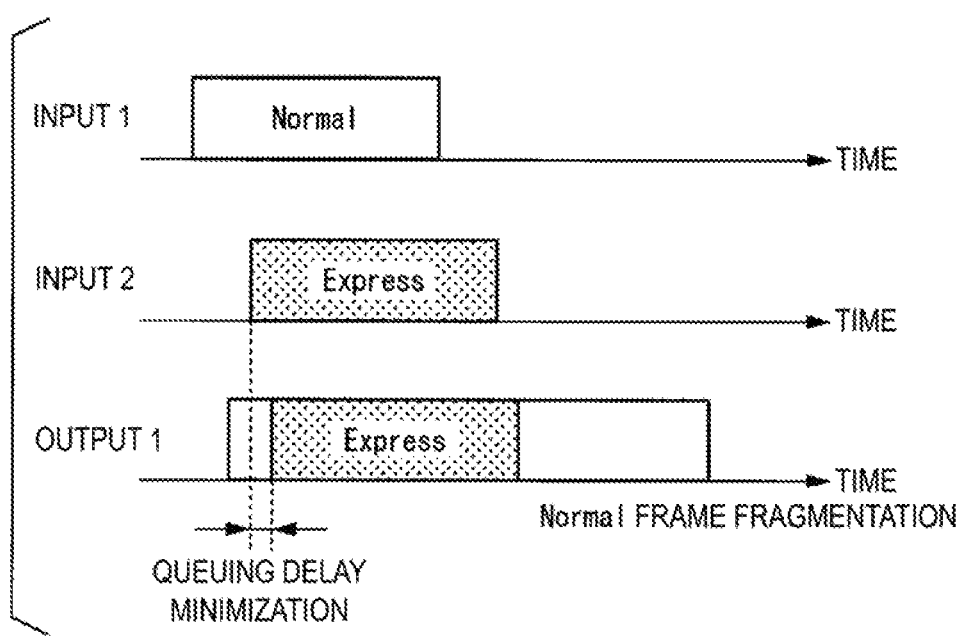
FIG. 11 is a diagram illustrating a transfer method based on an FP scheme.
Figure 12:
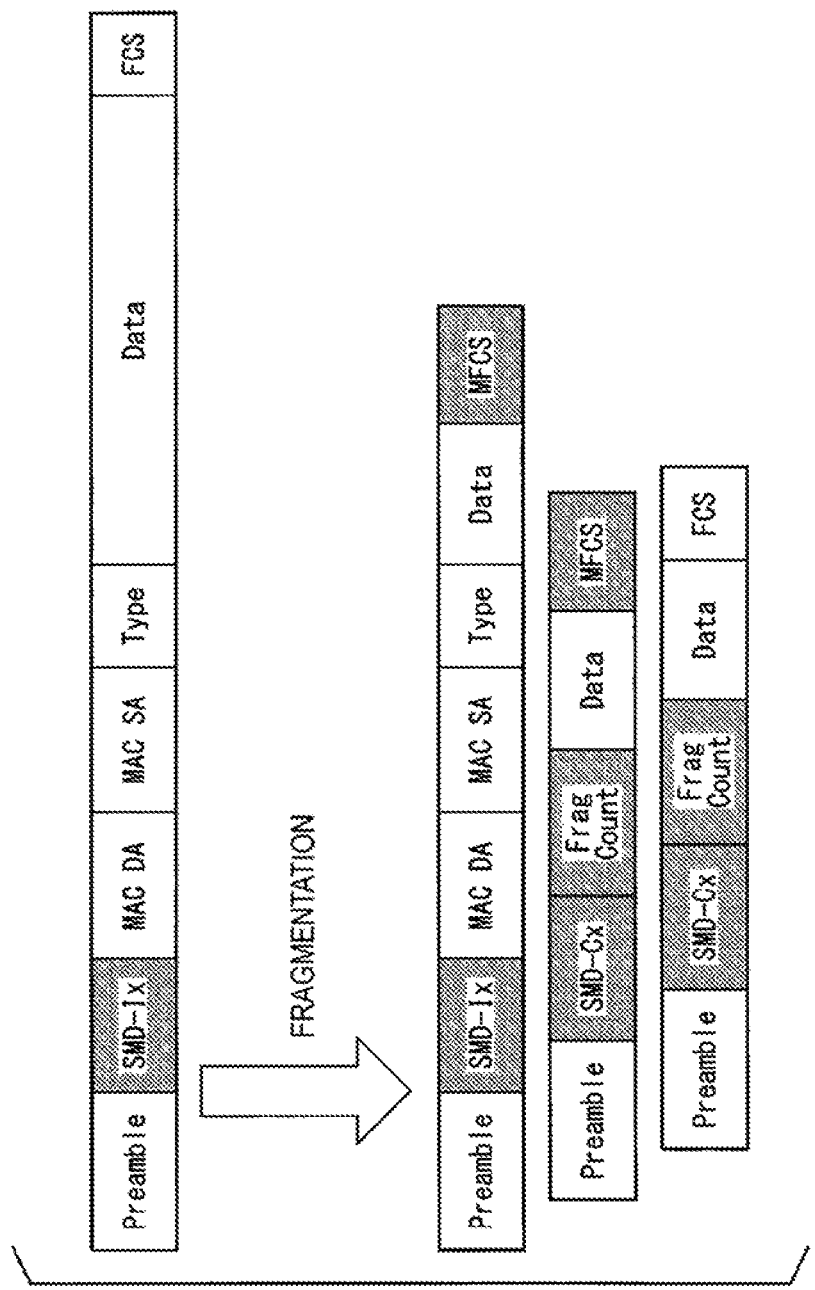
FIG. 12 is a diagram illustrating a frame configuration of a Normal frame in the FP scheme.

A transfer device according to a third embodiment is a transfer device used in a communication network in which particular Normal frames are defragmented only in a particular bridge node. FIG. 7 is a block diagram illustrating a configuration of a frame defragmentation unit 102b of the transfer device according to the third embodiment. A major difference between the frame defragmentation unit 102b and the frame defragmentation unit 102 according to the first embodiment is that the node identifier reference unit 1022 includes a defragmentation determination unit 1024.

The defragmentation determination unit 1024 determines whether or not frame defragmentation is performed on the basis of the node identifier and the reference table 1021 referenced by the node identifier reference unit 1022. In a case where the defragmentation determination unit 1024 determines that the frame defragmentation is not performed, the received Normal frame is output (passed) to the multiplexing unit without via the node identifier discarding units 1026 and the frame defragmentation buffer units 1027.

FIG. 8 is a diagram illustrating a configuration of the reference table 1021 used in the third embodiment. As illustrated in FIG. 8, the reference table 1021 contains data, in a form of two-dimensional table, of values of three items of "node identifier", "operational rule", and "transfer destination function unit" which are associated with each other.

The item "node identifier" stores a value of the node identifier.

The item "operational rule" stores a value indicating whether the received Normal frame is a Normal frame to be "discarded", is a Normal frame" to be defragmented", or is a Normal frame to be "passed".

The item "transfer destination function unit" stores a value indicating whether an output destination of the received Normal frame is the frame discarding unit 1025, the node identifier discarding unit 1026, or the multiplexing unit 20.

By referencing to the reference table 1021 above, the node identifier reference unit 1022 can determine whether to perform discarding, defragmenting, or passing on the received Normal frame.

As described above, the transfer device according to the embodiments of the present invention is a packet transfer device performing transfer based on the FP scheme, and, in transmission, adds a node identifier corresponding to a source bridge node of the Normal frame to a header of the fragmented Normal frame, and in reception, sorts the fragmented Normal frames for each node identifier added to the header of the Normal frame to perform the frame defragmentation process.

This allows the transfer device according to embodiments of the present invention to correctly defragment the received Normal frames in accordance with the node identifiers even when the fragmented standard frames are separately received from a plurality of bridge nodes.

Note that a part or all of the transfer device according to the embodiments described above may be realized by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the transfer device, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a certain period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

A part or all of the transfer device in the embodiments described above may be realized as an integrated circuit such as a Large Scale Integration (LSI). Each function block of the transfer device may be individually realized as processors, or a part or all thereof may be integrated into processors. Furthermore, a circuit integration technique is not limited to the LSI, and a part of or all of the transfer device may be realized with a dedicated circuit or a general-purpose processor. In a case that with advances in semiconductor technology, a circuit integration technology with which an LSI is replaced appears, an integrated circuit based on the technology may be used.

REFERENCE SIGNS LIST 1 transfer device
10 reception unit
20-1 multiplexing unit
20-2 multiplexing unit
30 transmission unit
101 separation unit
102 frame defragmentation unit
301-1 buffer unit
301-2 buffer unit
302 priority control unit
303 frame fragmentation control unit
1021 reference table
1022 node identifier reference unit
1023 identifier sort unit
1024 defragmentation determination unit
1025 frame discarding unit
1026 node identifier discarding unit
1027 frame defragmentation buffer unit
3031 interrupt transfer processing unit
3032 frame fragmentation unit
3033 node identifier addition unit
3034 transmission suspending unit

The invention claimed is:

1. A transfer device for coupling a priority service signal and a standard service signal, and transferring signals to form a communication network, the transfer device comprising:
a processor; and
a storage medium having computer program instructions stored thereon, wherein the computer program instructions, when executed by the processor, perform to:
receive a plurality of signals transmitted from a device connected to a path different from a forwarding path in a transfer route of the communication network;
separate the plurality of signals into the priority service signal and the standard service signal;
reference a unique identifier added to the standard service signal;
sort the standard service signal by the unique identifier;
discard the unique identifier added to the standard service signal;
hold a plurality of the standard service signals of which the unique identifiers are discarded and couple the plurality of the standard service signals;
multiplex the priority service signal and the standard service signal;
hold signals for respective services;
determine a transfer order of the signals in accordance with priorities of the signals;
transmit the signals for respective services to a device connected to the forwarding path in the transfer route;
perform interrupt processing in a case where the priority service signal arrives during transfer of the standard service signal;
divide the standard service signal in a case where the interrupt processing is performed;
add the unique identifier to the standard service signal; and
suspend transfer of the standard service signal until transfer of the priority service signal is completed.

2. The transfer device according to claim 1, wherein the computer program instructions further perform to:
add the unique identifier based on an identifier corresponding to the standard service.

3. The transfer device according to claim 1, wherein the computer program instructions further perform to:
add the unique identifier based on a randomly generated value.

4. The transfer device according to claim 1, wherein the computer program instructions further perform to:
adds the unique identifier that is a hash value generated based on an identifier corresponding to the standard service.

5. The transfer device according to claim 1, wherein the computer program instructions further perform to:
determine whether to couple the signals on the basis of the identifier.

6. A transfer method for coupling a priority service signal and a standard service signal, and transferring signals to form a communication network, the transfer method comprising:
receiving a plurality of signals transmitted from a device connected to a path different from a forwarding path in a transfer route of the communication network;
separating the plurality of signals received by the receiving into the priority service signal and the standard service signal;
referencing a unique identifier added to the standard service signal;
sorting the standard service signal by the unique identifier referenced by the referencing;
discarding the unique identifier added to the standard service signal sorted by the sorting;
buffering a plurality of the standard service signals of which the unique identifiers are discarded by the discarding and coupling the plurality of the standard service signals;
multiplexing the priority service signal separated by the separating and the standard service signal coupled by the coupling;
holding signals for respective services multiplexed by the multiplexing;
determining a transfer order of the signals held by the buffering in accordance with priorities of the signals;
transmitting the signals for respective services to a device connected to the forwarding path in the transfer route;
performing interrupt processing in a case where the priority service signal arrives during transfer of the standard service signal;
dividing the standard service signal in a case where the interrupt processing is performed;
adding the unique identifier to the standard service signal divided by the dividing; and suspending transfer of the standard service signal until transfer of the priority service signal is completed.

\* \* \* \* \*